(12) United States Patent
Gondorf et al.

(10) Patent No.: US 8,796,402 B2
(45) Date of Patent: Aug. 5, 2014

(54) PROCESS FOR START-UP OF A POLYMERISATION REACTION FLUIDISED BED

(71) Applicant: Ineos Commercial Services UK Limited, Hampshire (GB)

(72) Inventors: Andreas Harald Gondorf, Neuss (DE); Jose Andre Laille, Salon de Provence (FR); Claudine Viviane Lalanne-Magne, Saint Mitre les Remparts (FR)

(73) Assignee: Ineos Commercial Services UK Limited, Hampshire (GB)

(*) Notice: Subject to any disclaimer, the term of this patent is extended or adjusted under 35 U.S.C. 154(b) by 0 days.

(21) Appl. No.: 13/763,252

(22) Filed: Feb. 8, 2013

(65) Prior Publication Data
US 2014/0135467 A1    May 15, 2014

Related U.S. Application Data

(63) Continuation of application No. 12/737,880, filed as application No. PCT/EP2009/062188 on Sep. 21, 2009, now abandoned.

(30) Foreign Application Priority Data
Oct. 3, 2008  (EP) ................................ 08165822

(51) Int. Cl.
*C08F 4/00*    (2006.01)
*C08F 4/44*    (2006.01)
*C08F 210/00*  (2006.01)

(52) U.S. Cl.
USPC ............................. 526/90; 526/183; 526/348

(58) Field of Classification Search
CPC ................. B01J 8/1809; B01J 2208/00646; B01J 2208/00716; C08F 210/16; C08F 2/34; C08F 2400/02; C08F 210/14
USPC ........................................... 526/90, 183, 348
See application file for complete search history.

(56) References Cited

U.S. PATENT DOCUMENTS

| | | | |
|---|---|---|---|
| 4,543,399 | A | 9/1985 | Jenkins, III et al. |
| 4,588,790 | A | 5/1986 | Jenkins, III et al. |
| 4,675,369 | A * | 6/1987 | Cook et al. .................. 526/129 |
| 6,365,681 | B1 | 4/2002 | Hartley et al. |

FOREIGN PATENT DOCUMENTS

| | | |
|---|---|---|
| EP | 0 475 603 A1 | 3/1992 |
| EP | 0 658 570 A2 | 6/1995 |
| EP | 0 855 411 A1 | 7/1998 |
| FR | 2 772 383 A1 | 6/1999 |
| WO | WO 98/54231 A1 | 12/1998 |

* cited by examiner

*Primary Examiner* — William Cheung
(74) *Attorney, Agent, or Firm* — Nixon & Vanderhye P.C.

(57) ABSTRACT

Process for polymerization and, in particular, to a process for start-up of a gas phase fluidized bed polymerization reaction involving one or more monomers using a catalyst in a reactor. The process includes providing a start-up bed of particles in the reactor in the presence of the one or more monomers but in the absence of the catalyst, introducing at $T_0$ catalyst to the reactor to initiate reaction and start-up polymer production at a time $T_i$, $T_i$ being between 1 and 6 hours after $T_0$. The value of $X_i$ is less than a threshold value, wherein: $X_i$=Cumulative production in the time period $T_0$ to $T_i$/(Cumulative catalyst injection the time period $T_0$ to $T_i * P_i C_{2=}$), where $P_i C_{2=}$ is the ethylene partial pressure in the reactor at the time $T_i$, subsequently stopping the injection of catalyst, and taking a corrective action to address the low value of $X_i$.

6 Claims, 2 Drawing Sheets

Example B

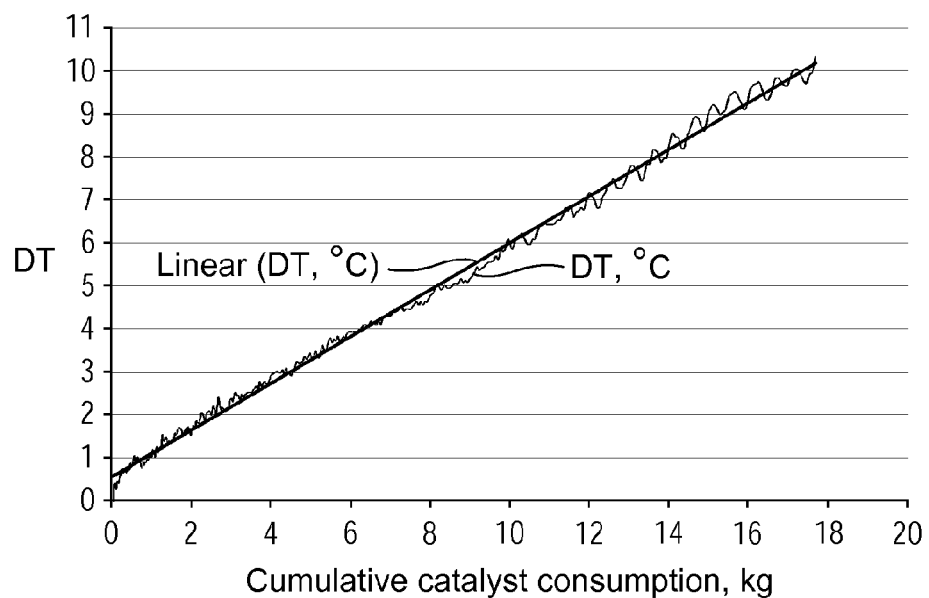
Fig. 1  Example A
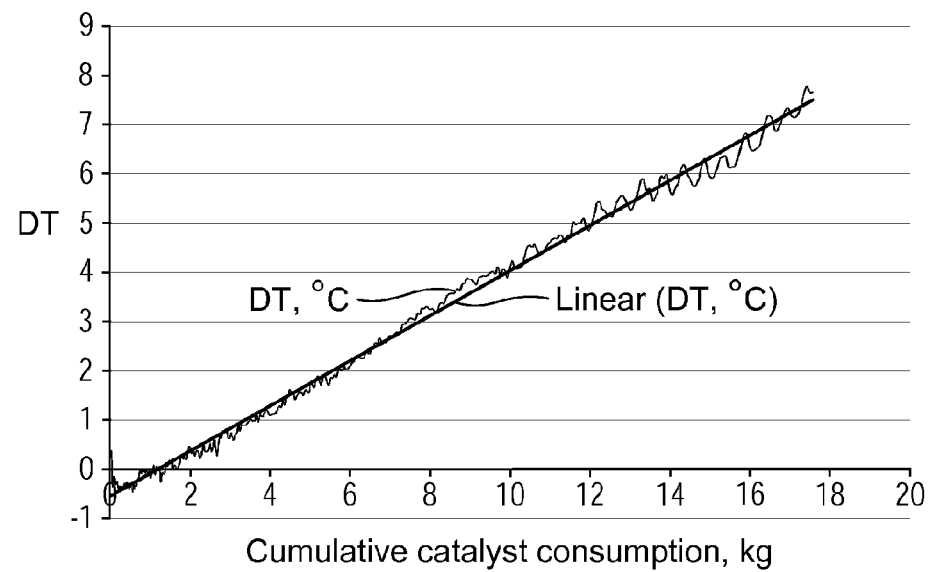
Fig. 2  Example B

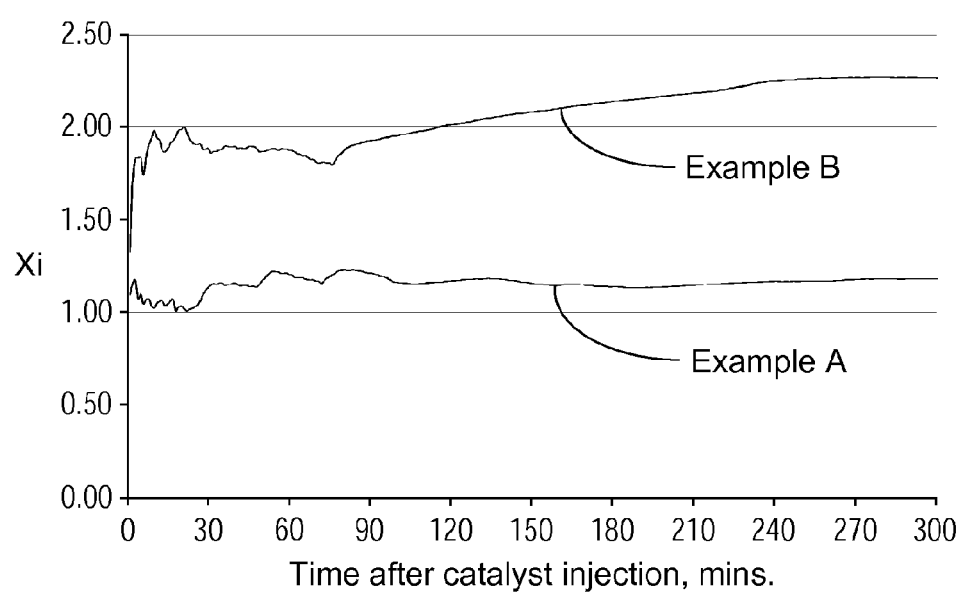

PROCESS FOR START-UP OF A POLYMERISATION REACTION FLUIDISED BED

This is a continuation of application Ser. No. 12/737,880 filed Feb. 25, 2011, which is a 371 of PCT/EP2009/062188 filed Sep. 21, 2009 claims priority to European Application No. 08165822.1 filed Oct. 3, 2008, the entire contents of each of which are hereby incorporated by reference.

The present invention relates to a process for polymerisation, and, in particular, to a process applicable to start-up of a gas phase fluidised bed polymerisation reaction.

BACKGROUND OF THE INVENTION

Processes for the polymerization of olefins are well known in the art. Such processes can be conducted, for example, by introducing an olefinic monomer and other reagents, such as comonomers, chain transfer agents and inert reagents, into a polymerization reactor comprising polyolefin and a catalyst for the polymerization.

A number of different types of catalyst are also known for use in polymerisations, including so-called "Philips" catalysts, Ziegler-Natta catalysts and metallocene catalysts.

Processes for polymerisation, whilst widely operated commercially, can be sensitive to many factors which affect properties of the reaction, such as activity, or the product, such as density and Melt Index. For example, impurities that affect activity can come from the feedstocks, the start-up bed or residual contamination in the reaction loop, but are not easily detected by conventional on-line analysers. Thus, even when there is plenty of past commercial experience with a particular reaction, it is still possible that the particular reaction, when started-up, will not produce the target polymer at the targeted, or expected, productivity. Whilst it is generally possible, once polymer is being produced, to adjust reaction conditions to obtain the desired product properties, overcoming "low activity" can be more complicated. For example, a lower activity than expected may be a sign of reactor contamination, and whilst it may be possible to operate with slightly reduced activity compared to that expected in some cases, in other cases it is necessary to shut-down the reaction and clean the reactor prior to starting up the reaction again.

Further, a reduced activity during start-up may also indicate a build-up of unreacted catalyst. If the reason for the reduced activity is suddenly removed then there results the potential for a sudden "runaway" reaction using the built-up catalyst.

SUMMARY OF THE INVENTION

The present invention relates to a process for identifying such a situation as early as possible. In general, during start-up a reaction mixture is usually introduced into a reactor, and catalyst is injected to initiate reaction at an initial rate lower than the final desired production. Thereafter, production is increased by increasing the rate of catalyst injection, over time, to produce the desired final product at desired production rate. Inherently, many reaction parameters are deliberately varied during start-up. Further, the "natural" variations seen in polymerisation processes also occur during start-up, and even when trying to make a particular product that might have been made many times before, no start-up is ever exactly the same as a previous one. Therefore, other than a complete failure of the reaction e.g. to start at all, it has been difficult to identify reactions with more intermediate problems until after a significant period of time, usually when operating at or close to the expected steady state conditions for the targeted productivity.

It has now been found that a polymerisation reaction where problems may arise may be identified and stopped during start-up.

Thus, according to the first aspect, the present invention provides a process for start-up of a gas phase fluidised bed polymerisation reaction, said reaction comprising polymerisation of one or more monomers using a catalyst in a reactor, and said process comprising:

a) providing a start-up bed of particles in the reactor in the presence of the one or more monomers but in the absence of the catalyst, b) introducing catalyst to the reactor to initiate reaction and start-up polymer production, said introduction being designated as time $T_0$, c) at a time $T_i$, $T_i$ being between 1 and 6 hours after $T_0$, the value of $X_i$ is less than a threshold value, wherein:

$$X_i = \frac{\text{Cumulative production in the time period } T_0 \text{ to } T_i}{(\text{Cumulative catalyst injection the time period } T_0 \text{ to } T_i * P_i C_{2=}),}$$

$P_1 C_{2=}$ being the ethylene partial pressure in the reactor at the time $T_i$, d) subsequently stopping the injection of catalyst, e) taking a corrective action to address the low value of $X_i$.

As noted above, the present invention relates to a process for identifying a situation where a particular reaction has "started" to produce polymer, but is likely to result in "low activity" at steady state, by which is meant will not produce the target polymer at the targeted, or expected, productivity. In the present invention, catalyst injection to these reactions is stopped and a corrective action taken to try to address the low productivity being achieved during start-up. By identifying such reactions as soon as possible, the amount of time during which polymer is not produced at appropriate productivity is reduced.

In particular, the catalyst injection is stopped if the value X, is less than a threshold value, wherein:

$$X_i = \frac{\text{Cumulative production in the time period } T_0 \text{ to } T_i}{(\text{Cumulative catalyst injection the time period } T_0 \text{ to } T_i * P_i C_{2=})}$$

The units used for the process of the present invention are not especially critical, but the polymer production and catalyst injection should normally be in the same units of mass e.g. kg, such that they cancel out. $X_i$ then has units of inverse pressure. Ethylene partial pressure in the process of the present invention is conveniently measured in kPa, in which case $X_i$ is in units of /kPa, although other units can equally be used.

It is a feature of the present invention that polymerisation does initiate and polymer is produced when the catalyst is injected. Thus, $X_i$ will be greater than zero.

A minimum value of $X_i$ is not especially critical to the invention, but generally it is relatively easy to identify reactions that, even though started, have particularly low productions of polymer, and it is the intermediate activities that are harder to identify. Usually $X_i$ is at least 0.25/kPa, and preferably is at least 0.5/kPa.

In a first embodiment of the present invention, the catalyst injection is stopped if the value $X_i$ is less than a threshold value which is itself related to $X_{tar}$, wherein $X_{tar}$ is the targeted steady state production rate for the particular reaction which can be calculated according to the following equation:

$$X_{tar} = Z_{tar}/(Y_{tar} * P_{ss}C_{2=}),$$

Where:

$Z_{tar}$ is the targeted polymer production rate at steady state,
$Y_{tar}$ is the targeted catalyst injection rate at steady state, and
$P_{ss}C_{2=}$ is the ethylene partial pressure at steady state.

For avoidance of doubt, it should be understood that although the targeted production rates and catalyst injection rates are referred to as "steady state" such values are unlikely to stay completely constant in reality, but will vary with time. As a particular example, although a particular production rate may be targeted, a plot of production rate versus time will likely show significant oscillations, but about a mean value which represents the targeted value, and it is this mean value which is meant herein by the "steady state" value.

Such values are preferably derived from past (successful) operation of the same reaction in the same reactor, and can be equated to "expected" values based on said past operation. However, it is equally possible, for example when first operating a reaction in a particular reactor, that such values may also be calculated from operation in another reactor using experience of the relationships between the two reactors e.g. scaling up a reaction from pilot plant to commercial scale.

This embodiment of the present invention has the advantage that, by comparing to expected operation at steady state in a particular reaction, it is applicable to any size of reactor and catalyst, even though the absolute values of polymer production rate and catalyst activity can vary widely by reaction scale and catalyst type, for example.

As an example, the threshold value related to $X_{tar}$ may be set as 50% of $X_{tar}$.

However, more generally a particular plant or reactor is likely to have a fairly consistent start-up procedure, at least for particular types of catalyst, in which certain parameters such as the initial catalyst injection rate relative to the expected rate at steady state and the desired start-up ramp time are usually the same or similar. Thus, the skilled person can readily select a threshold value suitable for operation in a particular reactor and/or for a particular catalyst type or start-up procedure by looking at the values X, typically obtained in successful start-ups in past operation.

Although this may be used to select a threshold value related to $X_{tar}$ for a particular reactor, it has surprisingly been found, by comparison of a number of start-ups in a number of reactors, that it is possible for metallocene catalysts to define a threshold value independent of $X_{tar}$.

Thus, according to a second aspect, the present invention provides a process for start-up of a gas phase fluidised bed polymerisation reaction, said reaction comprising polymerisation of one or more monomers using a metallocene catalyst in a reactor having a diameter of 5 m or greater, said process comprising:

a) providing a start-up bed of particles in the presence of the one or more monomers but in the absence of the catalyst, b) introducing catalyst to initiate reaction and start-up polymer production, said introduction being designated as time $T_0$, c) at a time $T_i$, $T_i$ being between 1 and 6 hours after $T_0$, the value of $X_i$ is less than 2/kPa, wherein:

$$X_i = \frac{\text{Cumulative production in the time period } T_0 \text{ to } T_i}{(\text{Cumulative catalyst injection the time period } T_0 \text{ to } T_i * P_i C_{2=})},$$

$P_i C_{2=}$ being the ethylene partial pressure in the reactor at the time $T_i$, d) subsequently stopping the injection of catalyst, e) taking a corrective action to address the low value of $X_i$.

The process of this second aspect of present invention is particularly advantageous because metallocene catalysts tend to have a faster deactivation profile than other catalyst types, and in large scale reactors, by which is meant of over 5 m in diameter, the larger scale increases the advantages of identifying "problem" reactions earlier.

Any suitable fluidised bed reactor may be used in the process of the present invention. The reactor usually comprises a first section, which may also be generally referred to as a "fluidisation zone" and which is generally an upright cylindrical section, in which the fluidised bed of particles is maintained, above which is provided a second section which has an increased cross-sectional area compared to the fluidisation zone, and which may generally be referred to as the "disengagement zone". The reactors generally comprise a fluidisation grid located at or close to the base of the fluidisation zone which acts to distribute fluidising gas into the reactor, and which acts for a support for the particles in the reactor when the fluidising gas is not flowing. Examples of fluidised bed reactors and their operation include U.S. Pat. No. 4,588,790, U.S. Pat. No. 4,543,399, EP 0 475 603 and EP 0 855 411.

In general, steps (a) and (b) in the processes of the present invention represent essentially conventional start-up processes for a fluidised bed polymerisation reaction.

Thus, in step (a) the start-up bed of particles is usually introduced and then fluidised with a gas stream comprising the one or monomers, at reaction pressure, and heated to approximately the reaction temperature. The start-up bed is preferably inactive for polymerisation, such that polymerisation only occurs when catalyst is injected in step (b).

In step (b) the catalyst is injected and reaction starts to produce polymer.

In general operation it is possible that reaction does not start when catalyst is injected. Such a problem is, obviously, very easy to identify. The process of the present invention does not relate to such situations but to a situation where reaction does start initially, but problems are only normally identified much later.

Typically, in step (b) catalyst is injected to initiate reaction at a rate, $Y_0$, relative to the expected catalyst injection rate at steady state, $Y_{tar}$. Typically, $Y_0$ is equivalent to between 10% and 70% of $Y_{tar}$. Productivity is then increased by increasing the rate of catalyst injection, over time, to the value $Y_{tar}$. In conjunction, the rate of production of polymer increases, as correspondingly does the heat generated in the reaction This start-up process or start-up ramp is typically intended to take place over a time period, $T_{tar}$, which is defined herein as the planned time from $T_0$ until the catalyst injection rate is equal to the expected catalyst injection rate at steady state $Y_{tar}$. Typically this period is in the range 4 to 48 hours.

In steps (c) and (d) the catalyst injection is stopped because at a time $T_i$, between 1 and 6 hours after the initial injection of the catalyst, the value $X_i$ is less than a threshold value, wherein $$X_i = \frac{\text{Cumulative production in the time period } T_0 \text{ to } T_i}{(\text{Cumulative catalyst injection the time period } T_0 \text{ to } T_i * P_i C_{2=})}.$$

It has been found that the use of the cumulative production and the cumulative catalyst injection for the period $T_0$ to $T_i$ results in a smoothing of the productivity profile. In contrast the absolute values of either the production or catalyst injection rates are prone to significant oscillations.

The cumulative production rate is suitably calculated by taking the total feed rate to the reactor (ethylene, comonomer, hydrogen etc.) minus the reactor purge flow, and integrating by time the result over the time period $T_0$ to $T_i$.

Similarly, the cumulative catalyst injection is simply the catalyst injection rate integrated by time over the time period $T_0$ to $T_i$.

As noted above, for metallocene catalysts in a relatively large scale reactor it has been found that it is possible to operate the process of the present invention by selecting a threshold value independently of the expected steady state production rate.

It is desired to select the particular time, $T_i$, at which $X_i$ is to be compared to the threshold value, which is sufficiently after the time $T_0$ for sufficiently accurate productivity data to have been generated, but early enough to identify any potential concerns as quickly as possible. Hence a time within the time period $T_i$ of 1 to 6 hours is used in the process of the present invention. $T_1$ is preferably at least 2 hours.

In one embodiment, particular with a relatively short planned start-up ramp, the time, $T_i$, can also be related to $T_{tar}$, which is defined as the planned time from $T_0$ until the catalyst injection rate is equal to the expected catalyst injection rate at steady state $Y_{tar}$. By "relatively short planned start-up ramp" is meant a ramp with an expected $T_{tar}$ in the range 4 to 12 hours. In this embodiment, $T_i$ is preferably less than half of $T_{tar}$.

Alternatively, it is generally suitable to select a specific time, $T_i$, which is sufficiently after the time $T_0$ for sufficient productivity data to have been generated for all operations. For a particular plant or reactor the skilled person can readily select a suitable time based on successful start-ups in past operation.

Nevertheless for most start-up operations, a particularly suitable time, $T_i$, is four hours.

One particular advantage of the process of the present invention is that the process operates by using relatively simple parameters (polymer production rate, catalyst injection rate, ethylene partial pressure) which are already measured by conventional reactor instruments. Thus, the process may be easily applied on existing units as well as on new polymerisation reactors.

In step (d) the injection of catalyst into the reaction is stopped.

It is not necessary to stop injection of the catalyst straight away in the process of the present invention, but any delay is generally a delay in the taking of corrective action in step (e), and therefore a waste of otherwise potentially valuable runtime. Preferably, the injection of catalyst is stopped within 3 hours of the time $T_i$, more preferably within 1 hour of the time $T_i$, and most preferably essentially immediately after $T_i$, by which is meant within 10 minutes of the time $T_i$.

It should be noted that stopping injection of the catalyst will not lead to an immediate stopping of polymerisation, but productivity in the reactor will decrease with time once further catalyst injection is stopped and as the catalyst in the reactor reduces.

It is desirable to maintain the other reaction conditions in the reactor, such as the reaction temperature and pressure, and the fluidising gas velocity and composition, at least whilst the productivity initially reduces.

In step (e), a corrective action is taken to address the low value of $X_i$ obtained in step (c). In general, the corrective action will depend on the particular reaction, but will usually involve introduction of one or more scavengers into the reactor to react with impurities and contaminants in the reactor which have been inhibiting the catalyst. As an example, in reactions in which alkyl aluminiums are usually added with the catalyst, a typical corrective action would be to inject additional alkyl aluminium into the reactor.

Other corrective actions could include:
1) partially or completely venting hydrocarbons from the gas loop (recycle loop), optionally with purging, for example pressure purging, of the gas loop, and subsequently recomposing a "new" gas phase before restarting,
2) removing and replacing the start-up bed.

The corrective action may be commenced anytime after catalyst injection has been stopped in step (d). For example, the corrective action may be commenced essentially immediately. Alternatively, the corrective action may be performed after allowing the productivity to reduce by a suitable amount, for example to less than 50% of the productivity before catalyst injection is stopped, or after the production rate has reduced to zero, or is otherwise deemed to have effectively stopped, which may be considered, for example, as less than 10% of the production rate before catalyst injection is stopped.

Typically, after the corrective action in step (e), the present invention may further include, as step (f), reintroducing catalyst into the reactor and recommencing the start-up process. In a particularly preferred embodiment, the reintroduction of catalyst is considered as equivalent to step (b) and designated as time $T_0$, and if the value of $X_i$ is still not at least equal to the defined threshold the process of steps (c) and (d) is repeated. The process of the invention may be repeated in this way until the productivity is in excess of the defined threshold at the time $T_i$ or until it is decided to completely terminate the reaction.

BRIEF DESCRIPTION OF THE DRAWINGS

The present invention will now be illustrated by reference to the following Examples and FIGS. 1 to 3, where;

FIGS. 1 and 2 present the relationship between activity (measured as temperature differential (DT)) and cumulative catalyst consumption after catalyst injection in two experiments, and FIG. 3 presents plots of the value of Xi, as defined herein versus time, $T_i$, after catalyst injection for the same two experiments.

EXAMPLES

Example A

Ethylene is polymerised with 1-hexene as comonomer in a 5 meter diameter fluidised bed reactor, at a bed height of 16 m and using a metallocene catalyst.

A start-up bed of polymer particles is fluidised by a gas mixture of ethylene, 1-hexene, hydrogen, n-pentane and nitrogen (balance), at a temperature of 76° C. and a total pressure of 20 bar (2 MPa). The ethylene partial pressure was 12 bar (1200 kPa or 1.2 MPa). The pentane partial pressure was 2.4 bar, the 1-hexene to ethylene pressure ratio was 0.006, and the hydrogen to ethylene pressure ratio was 0.0027. The fluidisation velocity was 0.59 m/s.

After establishing the fluidised bed, the catalyst was injected into the reactor to initiate reaction. Activity was monitored by measuring the temperature differential (DT) between the top of the bed and the fluidising gas inlet. A plot of this versus cumulative catalyst consumption is shown in FIG. 1. The plot shows a steady increase in DT with catalyst consumption (and hence with time). FIG. 1 also shows a linear fit, which results in a line with a gradient of 0.54. The plot represents approximately the first 10 to 12 hours of operation, and is essentially what would be considered a typical ramp based on previous experience with this system, raising no concern for alarm.

However, the run failed to subsequently reach expected steady state operation, and severe agglomeration was experienced meaning that the reaction had to be stopped.

Example B

After the reaction of Example A was stopped, the bed was removed and replaced. The start-up bed was fluidised under the same gas phase composition and operating conditions initially as in Example A, but an additional dose of scavenger was used in the reactor prior to catalyst injection.

Activity after catalyst injection was again monitored by measuring the temperature differential (DT) between the top of the bed and the fluidising gas inlet. A plot of this versus cumulative catalyst consumption is shown in FIG. 2. The plot again shows a steady increase in DT with catalyst consumption (and hence with time). This time the linear fit has a gradient of 0.46. The plot again represents approximately the first 10 to 12 hours of operation, and is again essentially what would be considered a typical ramp based on previous experience with this system, raising no concern for alarm. In fact, if anything this ramp appears slightly worse than the Example A.

However, in this case the run reached expected steady state operation without agglomeration or any other problems.

For both of the above Examples, the value of Xi, as defined herein, was subsequently plotted against time, $T_i$, after catalyst injection. The results are shown in FIG. 3.

Although the reactions appeared essentially equivalent when comparison was made between DT (activity) and cumulative catalyst consumption (FIGS. 1 and 2), FIG. 3 clearly shows a distinction between the experiments. In particular, the calculation of the present invention shows that Example A produced a value Xi of only just over 1/kPa, which was approximately constant with time. In contrast, Example B produced a rate initially about 2/kPa, and which increased above 2/kPa at about 2 hours after catalyst injection, and stayed above 2/kPa thereafter. (This experiment reached a value of Xi, at steady state, of approximately 2.7/kPa.)

Thus, FIG. 3 clearly shows that the method of the present invention is able to distinguish between "good" and "poor" runs at an early point in the process, whereas a more "conventional" process monitoring would not have identified the distinction.

Using the process of the present invention with, for example, a $T_i$ of four hours, Example A would have at that point in time been identified as being "poor" due to the low value of $X_i$.

In the process of the present invention, at that time injection of the catalyst would have been stopped and corrective action taken, saving the time and cost that was subsequently required before Example A was actually identified as a poor experiment.

The experiment of Example B (or at least an equivalent thereof) could then have been commenced earlier, bringing the reactor to its required operation sooner (and when the process of the present invention was applied to the experiment of Example B it would have been identified as a "good" experiment and continued).

The invention claimed is:

1. A process for start-up of a gas phase fluidised bed polymerisation reaction, said reaction comprising polymerisation of one or more monomers using a catalyst in a reactor, and said process comprising:
   a) providing a start-up bed of particles in the reactor in the presence of the one or more monomers but in the absence of the catalyst,
   b) introducing catalyst to the reactor to initiate reaction and start-up polymer production, said introduction being designated as time $T_0$,
   c) at a time $T_i$, $T_i$ being between 1 and 6 hours after $T_0$, the value of $X_i$ is less than a threshold value, wherein:

$$X_i = \frac{\text{Cumulative production in the time period } T_0 \text{ to } T_i}{(\text{Cumulative catalyst injection the time period } T_0 \text{ to } T_i * P_i C_{2=})},$$

$P_i C_{2=}$=being the ethylene partial pressure in the reactor at the time $T_i$,
   d) subsequently stopping the injection of catalyst,
   e) taking a corrective action to address the low value of $X_i$.

2. A process according to claim 1, wherein the value of $X_i$ is less than a threshold value related to $X_{tar}$, wherein $X_{tar} = Z_{tar}/(Y_{tar} * P_{ss} C_{2=})$,
   where
   $X_{tar}$ is the targeted steady state production rate for the particular reaction,
   $Z_{tar}$ is the targeted polymer production rate at steady state,
   $Y_{tar}$ is the targeted catalyst injection rate at steady state, and
   $P_{ss} C_{2=}$ is the ethylene partial pressure at steady state.

3. A process according to claim 2 wherein the threshold value is 50% of $X_{tar}$.

4. A process according to claim 1 wherein the reaction comprises polymerisation of one or more monomers using a metallocene catalyst in a fluidised bed reactor having a diameter of 5 m or greater, and the reaction is stopped if the value of $X_i$ is less than 2/kPa.

5. A process according to claim 1 wherein $T_i$, is four hours.

6. A process according to claim 1 wherein the reaction is stopped within 3 hours of the time $T_i$.

* * * * *

UNITED STATES PATENT AND TRADEMARK OFFICE
CERTIFICATE OF CORRECTION

PATENT NO. : 8,796,402 B2  Page 1 of 1
APPLICATION NO. : 13/763252
DATED : August 5, 2014
INVENTOR(S) : Gondorf et al.

It is certified that error appears in the above-identified patent and that said Letters Patent is hereby corrected as shown below:

On the Title Page "[73] Assignee", please delete "Ineos Commercial Services UK Limited." and insert --Ineos Sales (UK) Limited--.

Signed and Sealed this
Twenty-first Day of April, 2015

Michelle K. Lee
*Director of the United States Patent and Trademark Office*